United States Patent
Igarashi

(10) Patent No.: US 9,578,721 B2
(45) Date of Patent: Feb. 21, 2017

(54) INSTRUMENT CONTROL DEVICE, INSTRUMENT CONTROL SYSTEM, INSTRUMENT CONTROL METHOD AND PROGRAM

(71) Applicant: SHIMIZU CORPORATION, Tokyo (JP)

(72) Inventor: Yuya Igarashi, Tokyo (JP)

(73) Assignee: SHIMIZU CORPORATION, Tokyo (JP)

( * ) Notice: Subject to any disclaimer, the term of this patent is extended or adjusted under 35 U.S.C. 154(b) by 0 days.

(21) Appl. No.: 14/438,281

(22) PCT Filed: Oct. 30, 2013

(86) PCT No.: PCT/JP2013/079342
§ 371 (c)(1),
(2) Date: Apr. 24, 2015

(87) PCT Pub. No.: WO2014/069496
PCT Pub. Date: May 8, 2014

(65) Prior Publication Data
US 2015/0289346 A1    Oct. 8, 2015

(30) Foreign Application Priority Data
Oct. 31, 2012   (JP) ................................ 2012-240943

(51) Int. Cl.
H05B 37/02 (2006.01)
H05B 39/04 (2006.01)
H05B 41/36 (2006.01)

(52) U.S. Cl.
CPC ...... H05B 37/0227 (2013.01); H05B 37/0272 (2013.01); Y02B 20/44 (2013.01)

(58) Field of Classification Search
None
See application file for complete search history.

(56) References Cited

U.S. PATENT DOCUMENTS

2012/0075101 A1* 3/2012 Austin ................... G01P 13/00
                                                                 340/572.1
2012/0158203 A1* 6/2012 Feldstein ............ G06F 1/3231
                                                                 700/295

FOREIGN PATENT DOCUMENTS

JP   A2005259430   9/2005
JP   A2007087839   4/2007

(Continued)

OTHER PUBLICATIONS

JP 2005-259430A, English translation by machine translation.*
International Search Report for PCT/JP2013/079342.

*Primary Examiner* — Anh Tran
(74) *Attorney, Agent, or Firm* — Hoffmann & Baron, LLP

(57) ABSTRACT

In the present invention, an instrument control device is provided with the following: a human detection sensor for detecting the presence or absence of a person in a specific region on the basis of temperature changes in the specific region; a tag correspondence communication device for communicating with a tag located in the specific region; and a communication unit for communicating with instruments that carry out a specific operation. The instrument control device is provided with an instrument operation control unit that causes an instrument to begin a specific operation in a case where the human detection sensor detects the presence of a person, and that causes the instrument to stop the specific operation in a case where no person is present as detected by the human detection sensor, and where the tag correspondence communication device is not communicating with the tag.

5 Claims, 7 Drawing Sheets

(56) References Cited

FOREIGN PATENT DOCUMENTS

| JP | A2008181874 | 8/2008 |
|----|-------------|--------|
| JP | A2011175759 | 9/2011 |
| JP | A2012155875 | 8/2012 |

\* cited by examiner

FIG. 2

| [AREA ID=a1]<br>[USER ID=Y1] | [AREA ID=a4]<br>[USER ID=Y4] | [AREA ID=a7]<br>[USER ID=Y7] | [AREA ID=a10]<br>[USER ID=Y10] | [AREA ID=a13]<br>[USER ID=Y13] | [AREA ID=a16]<br>[USER ID=Y16] |
|---|---|---|---|---|---|
| [AREA ID=a2]<br>[USER ID=Y2] | [AREA ID=a5]<br>[USER ID=Y5] | [AREA ID=a8]<br>[USER ID=Y8] | [AREA ID=a11]<br>[USER ID=Y11] | [AREA ID=a14]<br>[USER ID=Y14] | [AREA ID=a17]<br>[USER ID=Y17] |
| [AREA ID=a3]<br>[USER ID=Y3] | [AREA ID=a6]<br>[USER ID=Y6] | [AREA ID=a9]<br>[USER ID=Y9] | [AREA ID=a12]<br>[USER ID=Y12] | [AREA ID=a15]<br>[USER ID=Y15] | [AREA ID=a18]<br>[USER ID=Y18] |

AR

OF

| AREA ID | LIGHTING INSTRUMENT ID | DIMMING CONTROL DEVICE ID | USER ID | SENSOR ID | USER-SPECIFIC LUMINOUS INTENSITY |
|---|---|---|---|---|---|
| a1 | m1 | v1 | Y1 | s1 | 200 |
| a2 | m2 | v2 | Y2 | s2 | 300 |
| a3 | m3 | v3 | Y3 | s3 | 150 |
| ⋮ | ⋮ | ⋮ | ⋮ | ⋮ | ⋮ |
| a18 | m18 | v18 | Y18 | s18 | 250 |

INSTRUMENT CONTROL DEVICE, INSTRUMENT CONTROL SYSTEM, INSTRUMENT CONTROL METHOD AND PROGRAM

TECHNICAL FIELD

The present invention relates to an instrument control device, an instrument control system, an instrument control method, and a program.

Priority is claimed on Japanese Patent Application No. 2012-240943, filed Oct. 31, 2012, the content of which is incorporated herein by reference.

BACKGROUND ART

A lighting control system that detects the presence of a person using a pyroelectric human sensor to control lighting is known (for example, see Patent Document 1).

Moreover, a lighting control system including a tag that stores a lighting identifier for identifying associated lighting instrument and a tag reader that performs control related to lighting of the lighting instrument indicated by the lighting identifier upon receiving the lighting identifier from the tag via radio communication is known (for example, see Patent Document 2).

PRIOR ART DOCUMENTS

Patent Documents (Patent Document 1)
Japanese Unexamined Patent Application, First Publication No. 2012-155875
(Patent Document 2)
Japanese Unexamined Patent Application, First Publication No. 2011-175759

DISCLOSURE OF INVENTION

Problems to be Solved by the Invention

However, since the pyroelectric human sensor detects the presence of a person based on a temperature change, when a person remains substantially motionless, the human sensor outputs a wrong detection result that no person is present.

Moreover, active radio frequency identification (RFID) tags are frequently used as one type of tag. An active RFID tag can use a relatively large amount of power during communication because the tag is driven by a battery included therein. Due to this, the active RFID tag can communicate at a communication distance of, for example, approximately several tens of meters, and can communicate at a longer communication distance than a passive RFID tag.

However, since an active RFID tag uses a battery, the battery needs to be replaced eventually. As an example, in an active RFID tag which uses a general button cell, when the communication interval is set to three minutes, the battery life is approximately three years.

For example, when an active RFID tag is used to control instrument such as lighting instrument, the communication interval is set to approximately three minutes as above. In this case, even when a user carries an active RFID tag and moves to a place in which the active RFID tag can communicate with a tag reader, a delay of approximately up to three minutes occurs until instrument responds, and it is very difficult to use the instrument.

As a countermeasure to such a response delay of the instrument, the communication interval of the active RFID tag may be shortened to approximately several seconds, for example. However, when the communication interval is shortened, the amount of power consumption per unit time increases, and thus the battery life decreases. For example, if the communication interval of an active RFID tag of which the battery life is approximately three years when the communication interval is approximately three minutes is shortened to approximately three seconds, the battery life also decreases to approximately 20 days, for example. For example, replacing batteries approximately every 20 days is considerably troublesome. Moreover, frequent battery replacement results in an increase in the cost.

An object of some aspects of the present invention is to control instrument while avoiding detection errors of a human sensor and maintaining the battery life of tags at a predetermined level or higher.

Means for Solving the Problems (1) A first aspect of the present invention is an instrument control device including: a communication unit that communicates with a human sensor that detects the presence of a person in a predetermined area based on a temperature change in the predetermined area, a tag-corresponding communication device that communicates with a tag positioned in the predetermined area, and instrument that performs a predetermined operation; and an instrument operation control unit that causes the instrument to start the predetermined operation when the human sensor detects the presence of a person and that stops the predetermined operation of the instrument when the absence of a person is detected by the human sensor and the tag-corresponding communication device is not communicating with the tag.

(2) In the first aspect of the present invention, the instrument control device may further include: an adjustment control unit that changes a predetermined adjustment item of the predetermined operation when the predetermined operation of the instrument started by the instrument operation control unit is executed and the tag-corresponding communication device is communicating with the tag.

(3) In the first aspect of the present invention, the human sensor may be installed in each of a plurality of predetermined areas, the instrument may be installed in each of the plurality of predetermined areas, the instrument control device may further include a control information storage unit that stores control information indicating at least an association among the human sensor, the instrument, a user carrying the tag, and an adjustment parameter corresponding to the adjustment item, and the adjustment control unit may change the adjustment item of the instrument associated with the user carrying the tag according to the adjustment parameter associated with the user carrying the tag based on the control information when the predetermined operation of the instrument started by the instrument operation control unit is executed and the tag-corresponding communication device is communicating with the tag.

(4) In the first aspect of the present invention, the human sensor may be installed in each of a plurality of predetermined areas, the instrument may be installed in each of the plurality of predetermined areas, the instrument control device may further include a control information storage unit that stores control information indicating at least an association among the human sensor, the instrument, and a user carrying the tag, and the instrument operation control unit may start the predetermined operation of the instrument associated with the human sensor having detected the presence of a person based on the control information and may stop the predetermined operation of the instrument associated with the human sensor having detected the absence of a person based on the control information when the tag carried by the user associated with the human sensor having detected the absence of a person is not communicating.

(5) A second aspect of the present invention is an instrument control system including: a human sensor that detects the presence of a person in a predetermined area based on a temperature change in the predetermined area; a tag-corresponding communication device that communicates with a tag positioned in the predetermined area; and an instrument control device that controls instrument that performs a predetermined operation, wherein the instrument control device includes an instrument operation control unit that causes the instrument to start the predetermined operation when the human sensor detects the presence of a person and that stops the predetermined operation of the instrument when the absence of a person is detected by the human sensor and the tag-corresponding communication device is not communicating with the tag.

(6) A third aspect of the present invention is an instrument control method including: communicating with a human sensor that is installed to detect the presence of a person in a predetermined area based on a temperature change in the predetermined area, a tag-corresponding communication device that communicates with a tag positioned in the predetermined area, and instrument that performs a predetermined operation; causing the instrument to start the predetermined operation when the human sensor detects the presence of a person; and stopping the predetermined operation of the instrument when the absence of a person is detected by the human sensor and the tag-corresponding communication device is not communicating with the tag.

(7) A fourth aspect of the present invention is a program for causing a computer to execute: communicating with a human sensor that is installed to detect the presence of a person in a predetermined area based on a temperature change in the predetermined area, a tag-corresponding communication device that communicates with a tag positioned in the predetermined area, and instrument that performs a predetermined operation; causing the instrument to start the predetermined operation when the human sensor detects the presence of a person; and stopping the predetermined operation of the instrument when the absence of a person is detected by the human sensor and the tag-corresponding communication device is not communicating with the tag.

Effects of the Invention

According to the aspects of the present invention, it is possible to control instrument while avoiding detection errors of a pyroelectric human sensor and maintaining the battery life of tags at a predetermined level or higher.

BRIEF DESCRIPTION OF THE DRAWINGS

FIG. 2 is a diagram illustrating a segmentation example of instrument control areas according to the present embodiment.

EMBODIMENTS FOR CARRYING OUT THE INVENTION

[Configuration Example of Instrument Control System]

Figure 1:
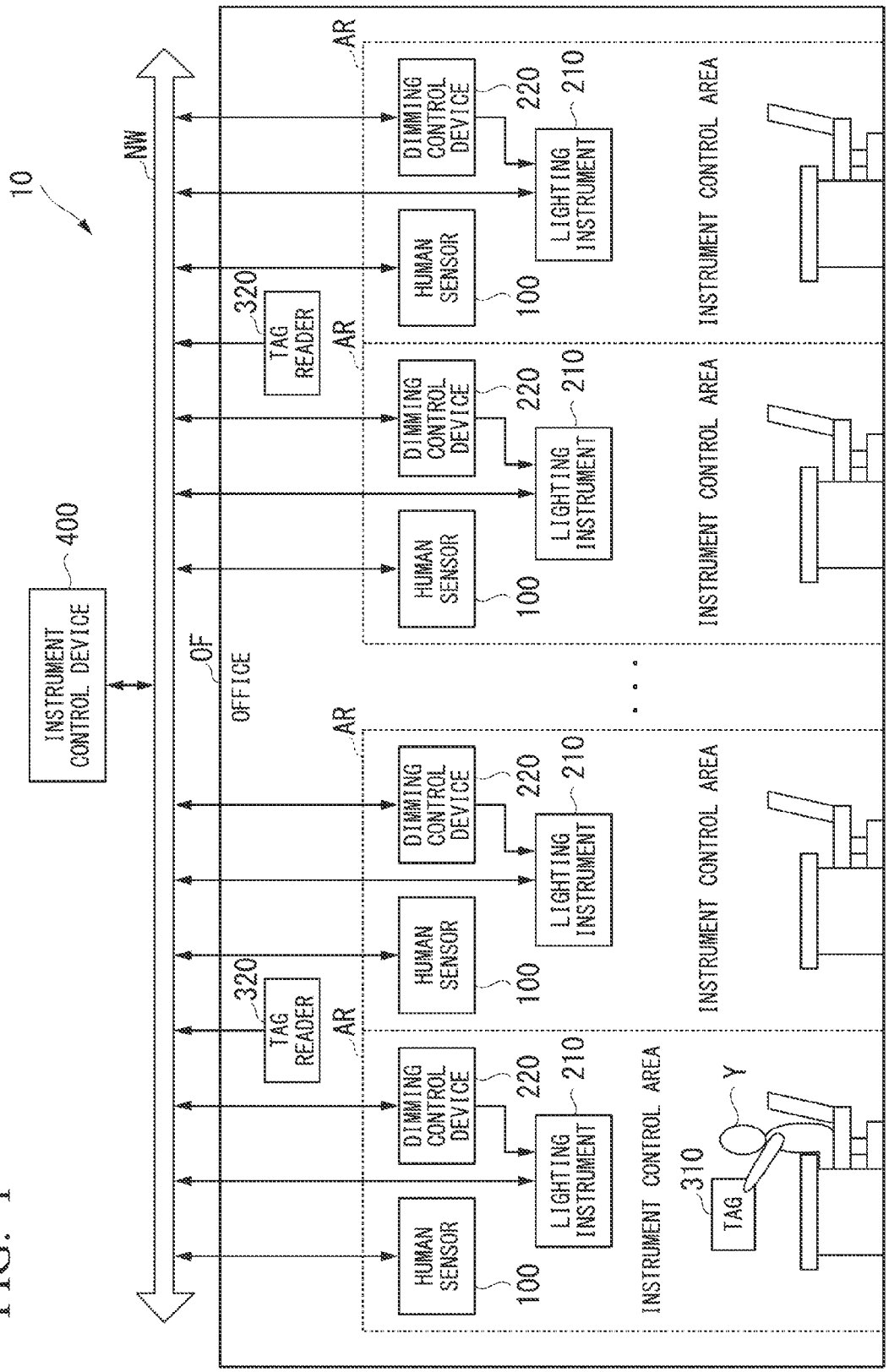
FIG. 1 is a diagram illustrating a configuration example of an instrument control system according to the present embodiment.

FIG. 1 is a diagram illustrating a configuration example of an instrument control system 10 according to an embodiment of the present invention.

In the instrument control system 10 of the present embodiment, an indoor space of an office OF is segmented into a plurality of instrument control areas AR.

As an example, the instrument control areas AR are segmented to correspond to respective places each allocated as a place in which one user Y works. Although the instrument control area AR may be allocated to correspond to a plurality of users Y, an example in which one instrument control area AR is allocated to one user Y will be described for the sake of convenience.

As illustrated in the drawing, a human sensor 100, lighting instrument 210, and a dimming control device 220, for example, are installed in the one instrument control area AR.

The human sensor 100 detects the presence of a person based on a temperature change. The human sensor 100 is installed to detect the presence of a person in the instrument control area AR based on a temperature change in the instrument control area AR. A pyroelectric human sensor, for example, is employed as the human sensor 100 of the present embodiment. That is, the human sensor 100 of the present embodiment detects a temperature change using light (including infrared rays) based on the pyroelectric effect to thereby detect the presence of a person.

The lighting instrument 210 is installed to perform lighting in the instrument control area AR. The lighting instrument 210 does this through an operation of turning on. Operations of turning the lighting instrument 210 on and off are controlled by an instrument control device 400.

That is, the instrument control device 400 issues an instruction to turn on to control target lighting instrument 210 via a network NW, for example. In response to the instruction to turn on, the control target lighting instrument 210 performs an operation of turning on from an off state. Moreover, the instrument control device 400 issues an instruction to turn off to the control target lighting instrument 210 via the network NW. In response to the instruction to turn off, the lighting instrument 210 performs an operation of turning off from an on state. The lighting instrument 210 is an example of instrument controlled by the instrument control device 400.

The dimming control device 220 adjusts a luminous intensity of the lighting instrument in accordance with the control of the instrument control device 400. That is, the instrument control device 400 issues an instruction on a luminous intensity to be set in the lighting instrument 210 to the dimming control device 220 via the network NW. The dimming control device 220 adjusts the luminous intensity of the lighting instrument 210 to the luminous intensity as instructed.

Although FIG. 1 illustrates an example in which the lighting instrument 210 and the dimming control devices 220 are each individual instrument and devices, the lighting instrument 210 may include a dimming control function of the dimming control devices 220, for example.

A user entering the office OF carries a tag 310. The tag 310 is an active radio frequency identification tag (RFID), for example.

The tag 310 which is an active RFID tag is driven with a battery included therein. Since the tag 310 can use a larger amount of power than a passive RFID tag which does not include a battery, the tag 310 can communicate at a communication distance of approximately several tens of meters, for example.

The user who is the owner of the tag 310 is fixedly determined in advance and a user ID of the user Y who is the corresponding owner is stored in the tag 310. The user ID is associated by the instrument control device 400, for example, with an area ID of the instrument control area AR which is the place of the user Y indicated by the user ID, an instrument ID of the lighting instrument 210, a sensor ID of the human sensor 100 in the instrument control area AR, and the like.

The tag 310 transmits the user ID stored therein every transmission interval of approximately three minutes, for example.

A tag reader (tag-corresponding communication device) 320 is installed in the office OF to execute communication with the tag 310 located in a communicable range. When there is a tag 310 that is in the communicable range, the tag reader 320 receives a user ID transmitted from the tag reader 320. The tag reader 320 transmits the information of the received user ID to the instrument control device 400 via the network NW.

The instrument control device 400 controls the lighting instrument 210. Specifically, the instrument control device 400 controls power of the lighting instrument 210 and controls luminous intensity when it is turned on.

The network NW of the instrument control system 10 may be a cable network or a wireless network. Moreover, the instrument control device 400 may be included in a system called a home energy management system (HEMS), for example.

[Example of Segmentation of Instrument Control Areas]

Next, a segmentation example of the instrument control area AR in the office OF will be described with reference to FIG. 2. FIG. 2 is a plan view of the office OF.

FIG. 2 illustrates an example in which a planar shape of the office OF is rectangular and the office OF is divided into eighteen instrument control areas AR in a planar direction. Area IDs for uniquely identifying the respective instrument control areas are assigned to the eighteen divided instrument control areas AR. FIG. 2 illustrates an example in which area IDs (=a1 to a18) are set to the eighteen instrument control areas AR.

The instrument control areas AR in the present embodiment are predetermined places of each user Y. Thus, the instrument control areas AR correspond to different users Y. In this way, the user IDs assigned to the corresponding users Y are allocated to the instrument control areas AR. FIG. 2 illustrates an example in which user IDs (=Y1 to Y18) are associated with the respective instrument control areas AR of the area IDs (=a1 to a18).

Figure 3:
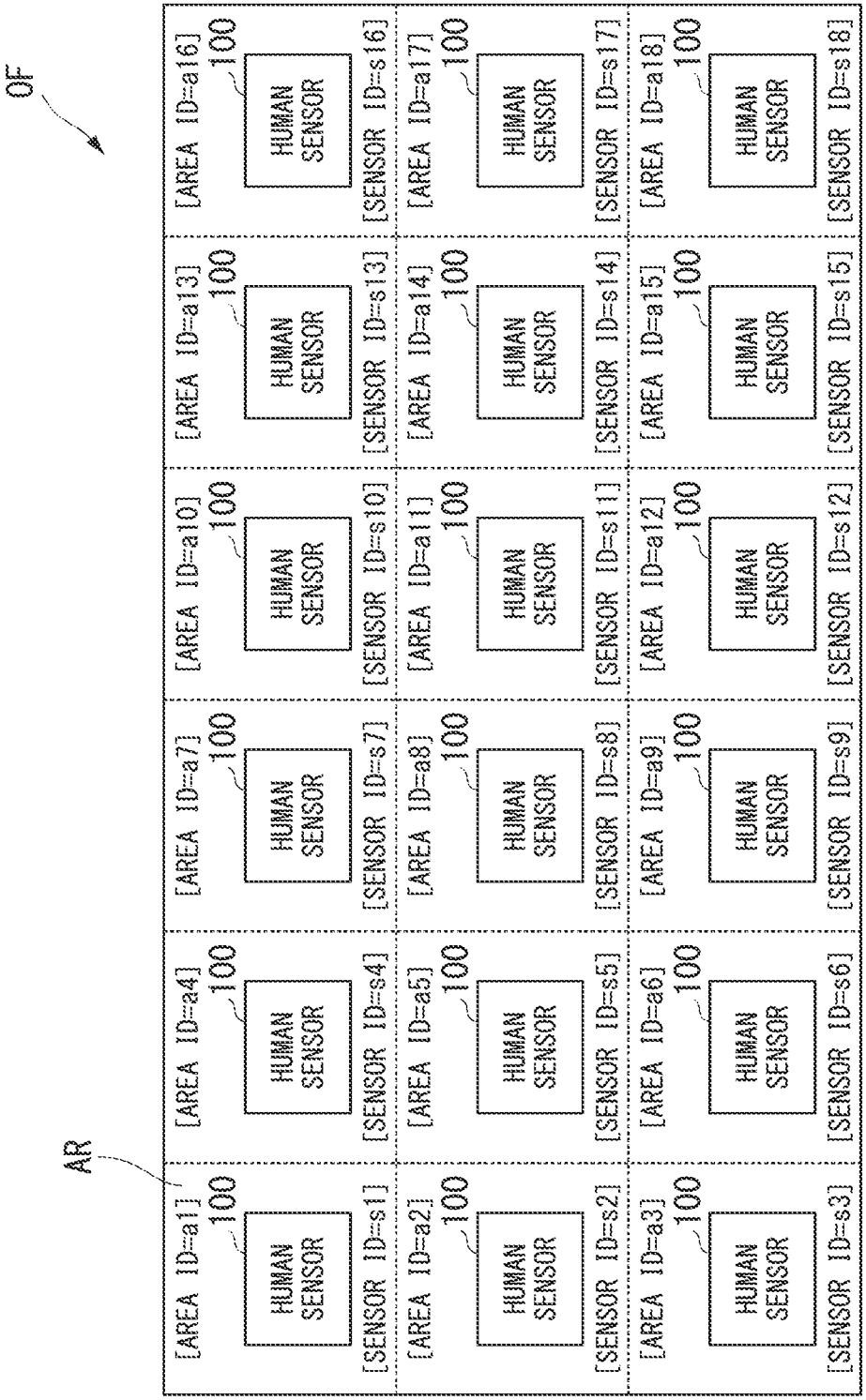
FIG. 3 is a diagram illustrating an installation example of human sensors according to the present embodiment.

As described in FIG. 1, the human sensors 100 are provided in the respective instrument control areas AR. That is, according to the segmentation illustrated in FIG. 2, one of the human sensors 100 is installed in each of the eighteen instrument control areas AR as illustrated in FIG. 3.

Sensor IDs for uniquely identifying the respective human sensors are assigned to these human sensors 100. FIG. 3 illustrates an example in which sensor IDs (=s1 to s18) are assigned to the respective human sensors 100 of the instrument control areas AR corresponding to the area IDs (=a1 to a18).

Each of the human sensors 100 installed in the instrument control areas AR in this manner detects the presence of a person in the instrument control area AR in which the human sensor is included.

The human sensors 100 are installed in the respective instrument control areas AR so that the presence of a person in the respective instrument control areas AR can be detected. In contrast, the tag reader 320 may be installed so that a plurality of instrument control areas AR in the office OF are included in a communicable range thereof. Since the tag 310 that communicates with the tag reader 320 is an active RFID tag as described above, the communication distance thereof is approximately several tens of meters, for example. Due to this, the tag readers 320 may be installed so that at least one tag reader is present in a communicable range of the tag 310 present at an arbitrary position in the office OF.

Figure 4:
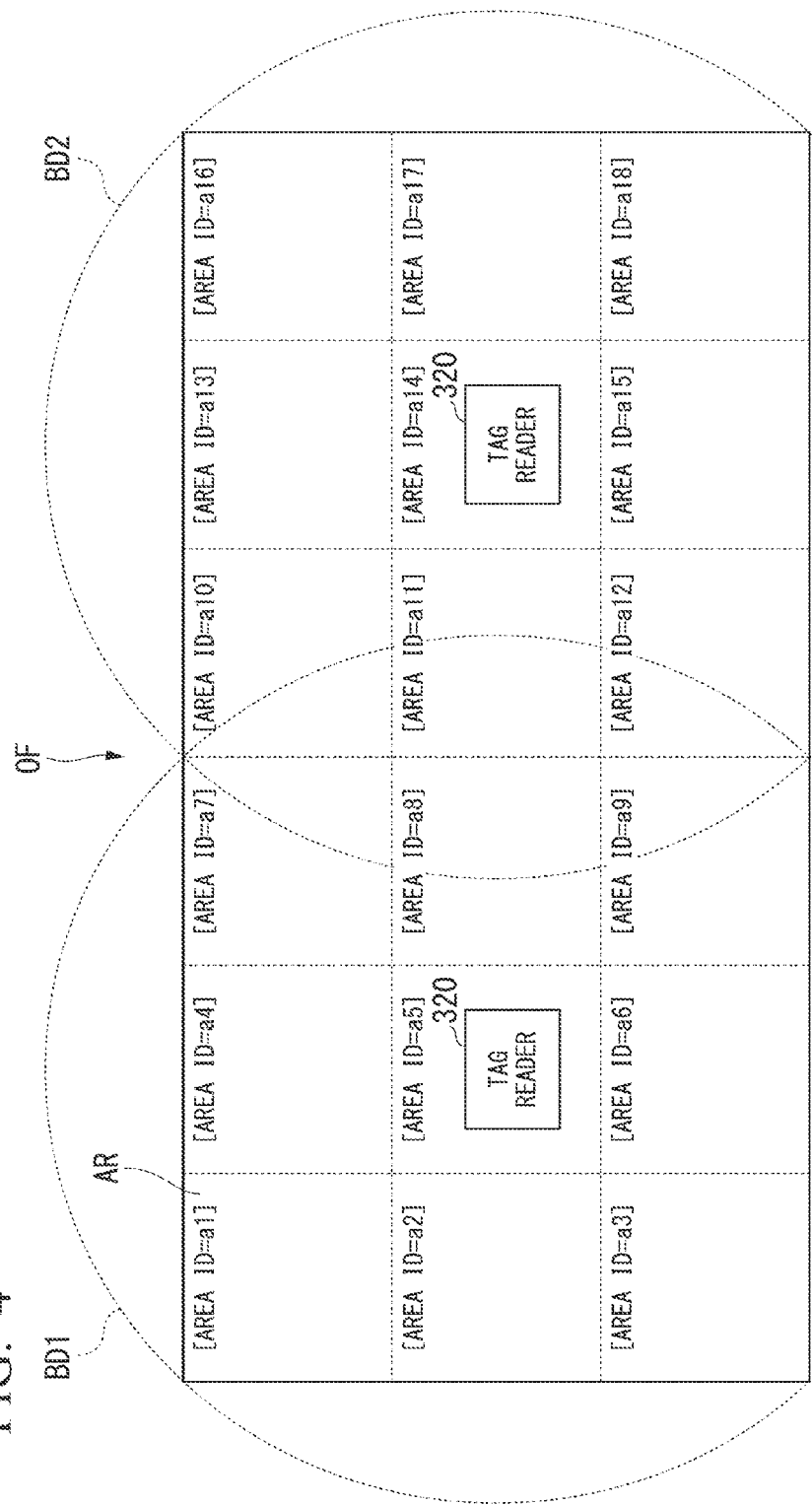
FIG. 4 is a diagram illustrating an installation example of tag readers according to the present embodiment.

FIG. 4 is a diagram illustrating an installation example of the tag readers 320 in the office OF. FIG. 4 illustrates an example in which two tag readers 320 are installed in the office OF.

In FIG. 4, one tag reader 320 is installed in the instrument control area AR corresponding to an area ID (=a5) which is approximately at the center of a left-half area formed by nine instrument control areas AR corresponding to the area IDs (=a1 to a9) in the office OF.

The tag reader 320 installed in the instrument control area AR corresponding to the area ID (=a5) forms a communicable range BD1 around the tag reader. The radius of the communicable range BD1 corresponds to the communication distance of the tag 310, for example. As illustrated in FIG. 4, the communicable range BD1 includes the nine instrument control areas AR corresponding to the area IDs (=a1 to a9), which is the left-half area of the eighteen instrument control areas AR in the office OF. Due to this, the tag reader 320 installed in the instrument control area AR corresponding to the area ID (=a5) can also communicate with the tag 310 located at an arbitrary position of the instrument control areas AR corresponding to the area IDs (=a1 to a9).

Moreover, the tag reader 320 is installed in the instrument control area AR corresponding to the area ID (=a14) which is approximately at the center of the right-half area formed by the nine instrument control areas AR corresponding to the area IDs (=a10 to a18) in the office OF.

The radius of a communicable range BD2 formed by the tag reader 320 installed in the instrument control area AR corresponding to the area ID (=a14) also corresponds to the communication distance of the tag 310, for example. The communicable range BD2 includes nine instrument control areas AR corresponding to the area IDs (=a10 to a18), which is the right-half area of the eighteen instrument control areas AR in the office OF. Due to this, the tag reader 320 installed in the instrument control area AR corresponding to the area ID (=a14) can also communicate with the tag 310 located at an arbitrary position in the instrument control areas AR corresponding to the area IDs (=a10 to a18).

The tag 310 can perform reliable communication with either one of the two tag readers 320 even when the tag 310 is located in an arbitrary instrument control area AR of the office OF.

[Configuration Example of Instrument Management Device]

Figures 5, 6:
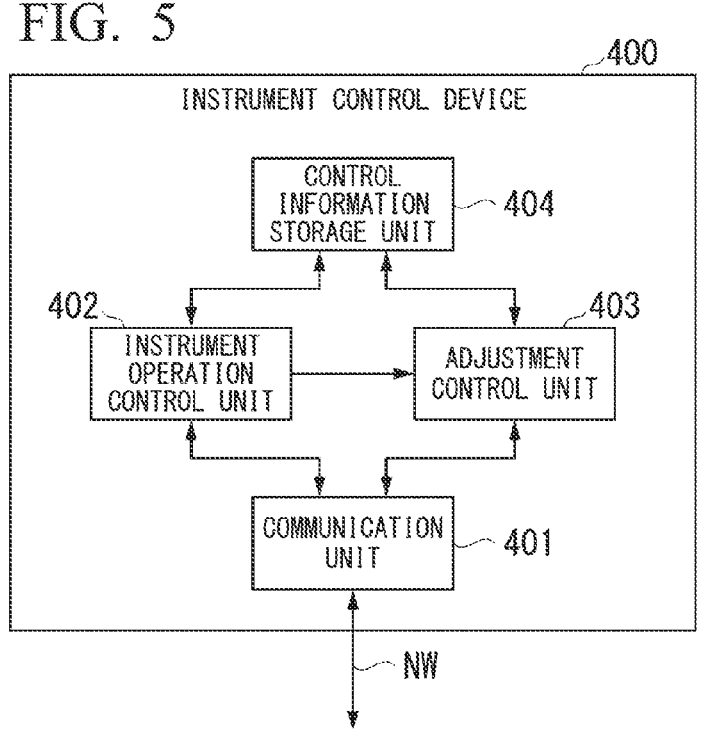
FIG. 5 is a diagram illustrating a configuration example of an instrument control device according to the present embodiment.
FIG. 6 is a diagram illustrating an example of the contents of control information according to the present embodiment.

FIG. 5 is a diagram illustrating a configuration example of the instrument control device 400. The instrument control device 400 includes a communication unit 401, an instrument operation control unit 402, an adjustment control unit 403, and a control information storage unit 404.

The communication unit 401 executes communication with the human sensor 100, the lighting instrument 210, the dimming control device 220, the tag reader 320, and the like in the office OF via the network NW.

FIG. 5 illustrates a configuration in which the instrument control device 400 communicates with the human sensor 100, the lighting instrument 210, the dimming control device 220, the tag reader 320, and the like via the network NW. However, when the human sensor 100, the lighting instrument 210, the dimming control device 220, and the tag reader 320 employ different communication schemes, for example, the communication unit 401 performs communication according to these communication schemes.

When the human sensor 100 detects the presence of a person, the instrument operation control unit 402 causes the instrument to start a predetermined operation. That is, when the human sensor 100 detects the presence of a person in the instrument control area AR, the instrument operation control unit 402 turns the lighting instrument 210 in the instrument control area AR on.

Moreover, when the human sensor 100 detects the absence of a person and the tag reader 320 is in a state in which the tag reader 320 is not communicating with the tag 310, the instrument operation control unit 402 causes the instrument to stop the predetermined operation.

Specifically, such a state is a state in which the human sensor 100 has detected the absence of a person in the instrument control area AR and the tag reader 320 is not communicating with the tag 310 that stores the user ID of the user Y present in the place corresponding to the instrument control area AR. When this state is detected, the instrument operation control unit 402 turns the lighting instrument 210 off.

When the predetermined operation of the instrument started by the instrument operation control unit 402 is in execution and the tag reader 320 is communicating with the tag 310, the adjustment control unit 403 changes predetermined adjustment items of the operation.

Specifically, the adjustment control unit 403 changes the luminous intensity (adjustment item) of the lighting instrument 210 when the lighting instrument 210 is in an on state and the tag reader 320 is communicating with the tag 310 carried by the user Y in the instrument control area AR in which the lighting instrument 210 is installed.

The control information storage unit 404 stores control information. The control information indicates an association among the human sensors 100 installed in the plurality of instrument control areas AR, the lighting instrument 210 installed in the plurality of instrument control areas AR, and the users who carry the tags 310, for example. The control information of the present embodiment is further associated with an adjustment parameter corresponding to the adjustment item.

FIG. 6 is a diagram illustrating an example of the contents of the control information. The control information illustrated in FIG. 6 corresponds to a case in which the instrument control area AR is segmented into eighteen areas as illustrated in FIG. 2. That is, the control information includes records corresponding to the respective eighteen instrument control areas AR, and one record includes an area ID, a lighting instrument ID, a dimming control device ID, a user ID, a sensor ID, and a user-specific luminous intensity.

The area ID is an identifier for uniquely identifying the instrument control area AR as described above.

The lighting instrument ID is an identifier for uniquely identifying the lighting instrument 210 installed in the corresponding instrument control area AR.

The dimming control device ID is an identifier for uniquely identifying the dimming control device 220 that controls dimming of the lighting instrument 210 indicated by the corresponding lighting instrument ID.

The user ID is an identifier for uniquely identifying the user Y who uses the corresponding instrument control area AR as the place of the user.

The sensor ID is an identifier for uniquely identifying the human sensor 100 installed in the corresponding instrument control area AR.

The user-specific luminous intensity (adjustment parameter) is a luminous intensity that is individually set depending on the user Y indicated by the corresponding user ID. A luminous intensity corresponding to the preference of the user Y indicated by the corresponding user ID, for example, is set as the user-specific luminous intensity.

In this manner, depending on the control information, lighting instrument, a dimming control device, a user, and a user-specific luminous intensity are associated with the respective instrument control areas AR.

The instrument operation control unit 402 causes instrument associated with the human sensor 100 having detected the presence of a person to start a predetermined operation based on the control information. Moreover, when it is determined that the tag 310 associated with the human sensor 100 having detected the absence of a person is not in a communication state, the instrument operation control unit 402 stops the predetermined operation of the instrument associated with the human sensor 100 having detected the absence of a person based on the control information.

The instrument operation control unit 402 can appropriately control power of the lighting instrument 210 according to the presence state of the user Y in the respective instrument control areas AR by referring to the control information.

For example, the human sensor 100 transmits the detection information to the instrument control device 400 via the network NW by adding its sensor ID to the detection information. The instrument operation control unit 402 inputs the detection information received by the communication unit 401. When the input detection information indicates detection of the presence of a person, the human sensor 100 acquires the instrument ID in the record that includes the sensor ID added to the detection information from the control information and performs control so that the lighting instrument 210 corresponding to the instrument ID is on.

Moreover, when the human sensor 100 has detected the absence of a person, the instrument operation control unit 402 acquires the user ID of the person Y present in the place corresponding to the instrument control area AR in which the human sensor 100 is installed by referring to the control information.

More specifically, the instrument operation control unit 402 acquires the user ID included in the same record as the sensor ID added to the detection information of the human sensor 100 having detected the absence of a person from the control information.

The tag reader 320 performs communication with the tag 310 to transmit the received user ID to the instrument control device 400 via the network NW. The instrument operation control unit 402 determines whether a user ID identical to the user ID acquired from the control information in the above-described manner is present among the user IDs received from the communication unit 401. In this way, it is possible to determine whether or not the tag 310 carried by the user of the user ID acquired from the control information is in the state of communicating with the tag reader 320. When it is determined that the tag 310 is not in communication with the tag reader 320, the instrument operation control unit 402 performs control to turn the lighting instrument 210 off.

Moreover, when the predetermined operation of the instrument started by the instrument operation control unit 402 is in execution and the tag reader 320 is communicating with the tag 310, the adjustment control unit 403 changes the adjustment item of the instrument associated with the user carrying the tag 310 in accordance with the adjustment parameter associated with the user carrying the tag 310 based on the control information.

That is, the adjustment control unit 403 inputs the user ID that the tag reader 320 has received from the tag 310 and acquires the lighting instrument ID included in the same record as the input user ID from the control information. Moreover, the adjustment control unit 403 determines whether the lighting instrument 210 corresponding to the acquired lighting instrument ID is in an on state according to the control of the instrument operation control unit 402.

When it is determined that the lighting instrument 210 is in the on state, the adjustment control unit 403 acquires the dimming control device ID and the user-specific luminous intensity within the control information, included in the same record as the lighting instrument ID of the lighting instrument 210 in the on state from the control information. The adjustment control unit 403 instructs the dimming control device 220 indicated by the acquired dimming control device ID to perform dimming control according to the acquired user-specific luminous intensity. In this way, the luminous intensity of the lighting instrument 210 is changed to the luminous intensity indicated by the user-specific luminous intensity in the control information.

As described above, the user-specific luminous intensity can be set to reflect the preference of the user Y who uses the corresponding instrument control area AR, for example. In this way, when the user Y is present in the instrument control area AR, a luminous intensity corresponding to the preference of the user who uses the instrument control area AR can be set for the lighting instrument 210 corresponding to the instrument control area AR.

[Process Flow Example]

Figure 7:
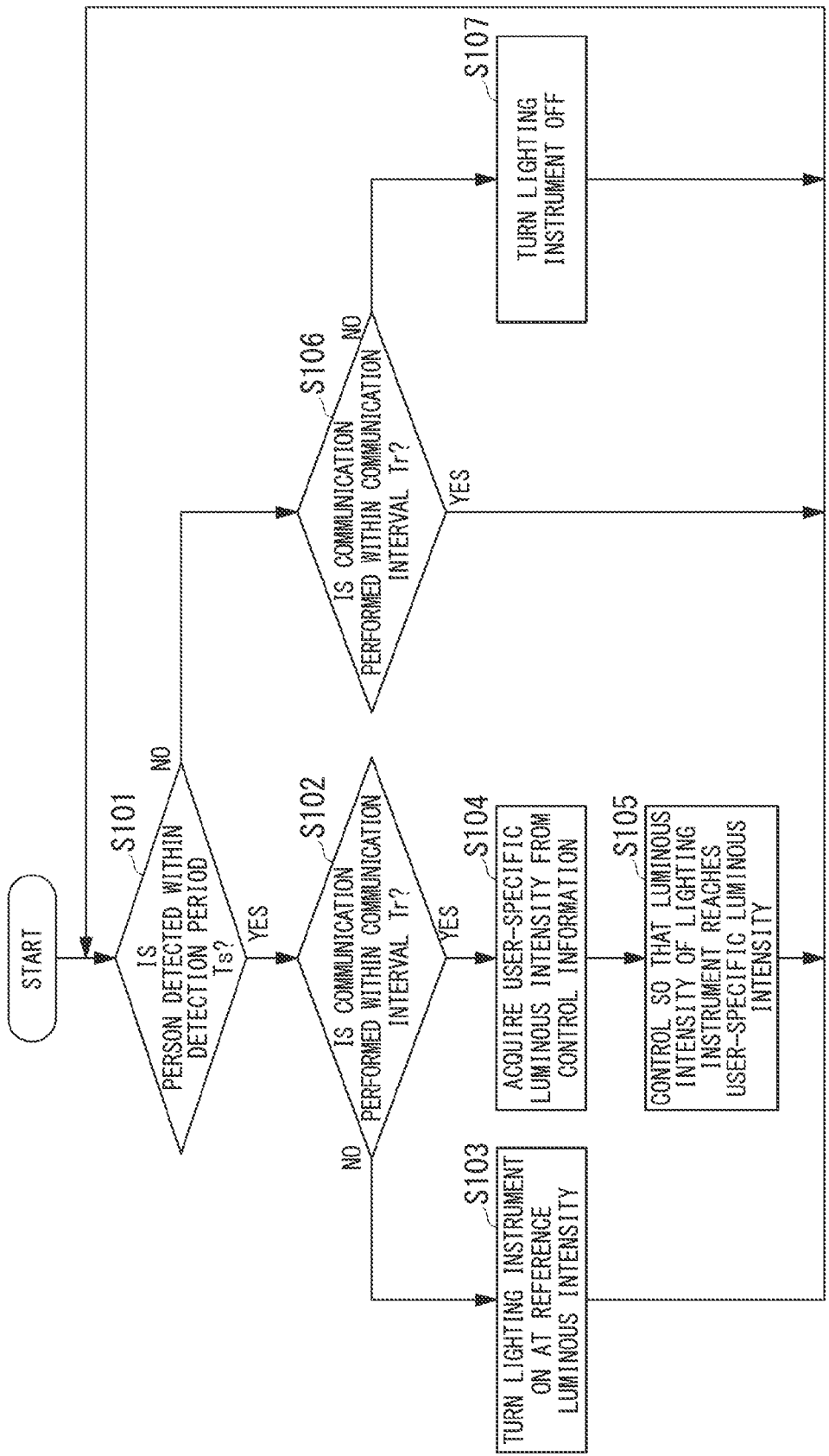
FIG. 7 is a diagram illustrating a process flow example of the processes executed by the instrument control device according to the present embodiment.

FIG. 7 is a diagram illustrating a process flow example of the processes that the instrument control device 400 performs to control the lighting instrument 210.

The instrument operation control unit 402 of the instrument control device 400 determines whether the human sensor 100 has detected a person in a past period of a detection period Ts from the present time-point (step S101).

The pyroelectric human sensor 100 of the present embodiment detects that a person is present by detecting a temperature change in the instrument control area AR. Due to this, when the user Y is moving, the human sensor 100 detects movement of the user Y as a temperature change and detects that a person is present. However, when the user Y is substantially motionless, since the human sensor 100 does not detect a temperature change, the human sensor 100 makes a detection error that no person is present.

However, for example, depending on the nature of his or her work, the user Y may often be in substantially the same posture, and a state in which the user Y in the instrument control area AR is substantially motionless may occur frequently. In this case, if the human sensor 100 is configured to output detection information indicating that a person is present only when a temperature change occurs, the human sensor 100 may output detection information indicating that no person is present even while the user Y is present in the instrument control area AR.

Therefore, in order to overcome this shortcoming, in the present embodiment, the human sensor 100 continues outputting detection information indicating that a person is present until a predetermined period elapses from the time at which a temperature change is detected. The predetermined period in which the detection information indicating that a person is present is continuously output from the time at which the temperature change is detected is the detection period Ts. Although the length of the detection period Ts is not particularly limited, the detection period may be approximately 30 seconds, for example.

The detection period Ts may be set by the instrument control device 400.

That is, the human sensor 100 is configured to output detection information indicating that a person is present only when a temperature change occurs. Further, when the detection information indicating that a person is present is received from the human sensor 100, the instrument operation control unit 402 assumes that the detection information indicating that a person is present is output until the detection period Ts elapses from the reception time-point of the detection information.

In FIG. 7, when it is determined that the human sensor 100 has detected a person (step S101: YES), the instrument operation control unit 402 additionally makes the following determination. That is, the instrument operation control unit 402 determines whether communication between the tag 310 carried by the user Y present in the place corresponding to the instrument control area AR in which the presence of a person is detected in step S101 and the tag reader 320 has been performed in a past period of a communication interval Tr from the present time-point (step S102).

Here, the tag 310 executes a communication operation of transmitting the user ID stored therein every predetermined time interval. The time interval at which the tag 310 executes the transmission operation is the communication interval Tr.

The communication interval Tr is set so that the life of a battery included in the tag 310 is maintained at a predetermined level or higher and that dimming control does not start too late. The predetermined level or higher of battery life is such a time length that the battery replacement frequency, an associated cost, and the like are in an allowable range. For example, the communication interval Tr may be approximately three minutes, for example.

The determination result that communication between the tag 310 and the tag reader 320 has not been performed (step S102: NO) is obtained, for example, in the following states.

For example, such a determination result is obtained in a state in which the user Y has entered the office OF and moved into the instrument control area AR corresponding to his or her place but the next communication interval Tr has not arrived since the user Y entered the office OF. In such a state, first communication between the tag 310 carried by the user Y and the tag reader 320 has not been executed.

Thus, the instrument operation control unit 402 performs control so that the lighting instrument 210 installed in the same instrument control area AR as the human sensor 100 having detected the presence of a person in step S101 is turned on with a predetermined reference luminous intensity (step S103). In this case, the instrument operation control unit 402 controls the lighting instrument 210 to turn on and controls the dimming control device 220 installed in the same instrument control area AR so that the lighting instrument 210 turns on at the reference luminous intensity.

After the process of step S103 ends, the instrument operation control unit 402 performs the process of step S101 again.

For example, when communication between the tag 310 and the tag reader 320 has not been performed (step S102: NO), the presence of a person in the instrument control area AR has already been detected in step S101. However, it cannot be determined that the detected person is the user Y who uses the instrument control area AR. This is because, when communication between the tag 310 and the tag reader 320 has not been performed, there is a possibility that the user Y whose place corresponds to the instrument control area AR in which the presence of a person is detected has not entered the office OF.

In contrast, when it is determined that communication between the tag 310 and the tag reader 320 has been performed (step S102: YES), the user whose place corresponds to the instrument control area AR in which the presence of a person is detected in step S101 is certainly present in the office OF. In this case, it is highly likely that the user Y who uses the instrument control area AR is present in the instrument control area AR.

Thus, in this case, the adjustment control unit 403 inputs the user ID that the tag 310 has transmitted to the tag reader 320 in step S102 from the tag reader 320. Further, the adjustment control unit 403 acquires a user-specific luminous intensity included in the record that includes the input user ID from the control information stored in the control information storage unit 404 (step S104).

Moreover, the adjustment control unit 403 controls the dimming control device 220 in the same instrument control area AR so that the lighting instrument 210 in the instrument control area AR in which the presence of a person is detected in step S101 is turned on with the luminous intensity indicated by the user-specific luminous intensity acquired in step S104 (step S105). In this way, the luminous intensity in the instrument control area AR is adjusted to correspond to the preference of the user Y who uses the instrument control area AR. After the process of step S105 ends, the adjustment control unit 403 performs the process of step S101 again.

Moreover, when the human sensor 100 has not detected a person in a past period of the detection period Ts from the present time-point (step S101: NO), the instrument operation control unit 402 makes the following determination. That is, the instrument operation control unit 402 determines whether communication between the tag 310 carried by the user Y whose place corresponds to the instrument control area AR in which the presence of a person is not detected in step S101 and the tag reader 320 has been performed in the past period of the communication interval Tr from the present time-point (step S106). The process of step S106 is the same as that of step S102.

It may be determined in step S106 that communication between the tag 310 and the tag reader 320 has been performed (step S106: YES) in the following situation.

For example, a situation in which the user is present in the instrument control area AR corresponding to his or her place and performing work or the like, but, for example, since a state in which the user is substantially motionless continues for a long period, the human sensor 100 outputs detection information indicating that the presence of a person has not been detected after the elapse of the detection period Ts may occur.

In such a state, since the user Y is present in the instrument control area AR, it is preferable to maintain the present on state of the lighting instrument 210 rather than turning the lighting instrument 210 off.

Therefore, in this case, the instrument operation control unit 402 or the adjustment control unit 403 performs the process of step S101 again without executing other processes in particular.

For example, when the process of step S103 has already been executed and the lighting instrument 210 is presently on at the reference luminous intensity, the on state of the lighting instrument 210 at the reference luminous intensity is maintained in the flow returning from step S106 to step S101.

Moreover, when the process of step S105 has already been executed and the lighting instrument 210 is presently on with the dimming controlled according to the user-specific luminous intensity, the dimming corresponding to the user-specific luminous intensity is maintained in the flow returning from step S106 to step S101.

Moreover, when it is determined in step S106 that communication between the tag 310 and the tag reader 320 has not been performed (step S106: NO), the user Y is not present in the office OF.

Therefore, in this case, the instrument operation control unit 402 executes control so that the lighting instrument 210 in the instrument control area AR where the presence of a person is not detected in step S101 is in the off state (step S107). After the process of step S107 ends, the instrument operation control unit 402 performs the process of step S101 again.

[Operation Example of Lighting Instrument]

A state transition example of the lighting instrument 210 when the instrument control device 400 executes processes according to the flowchart of FIG. 7 will be described with reference to the timing chart of FIG. 8.

Figure 8:
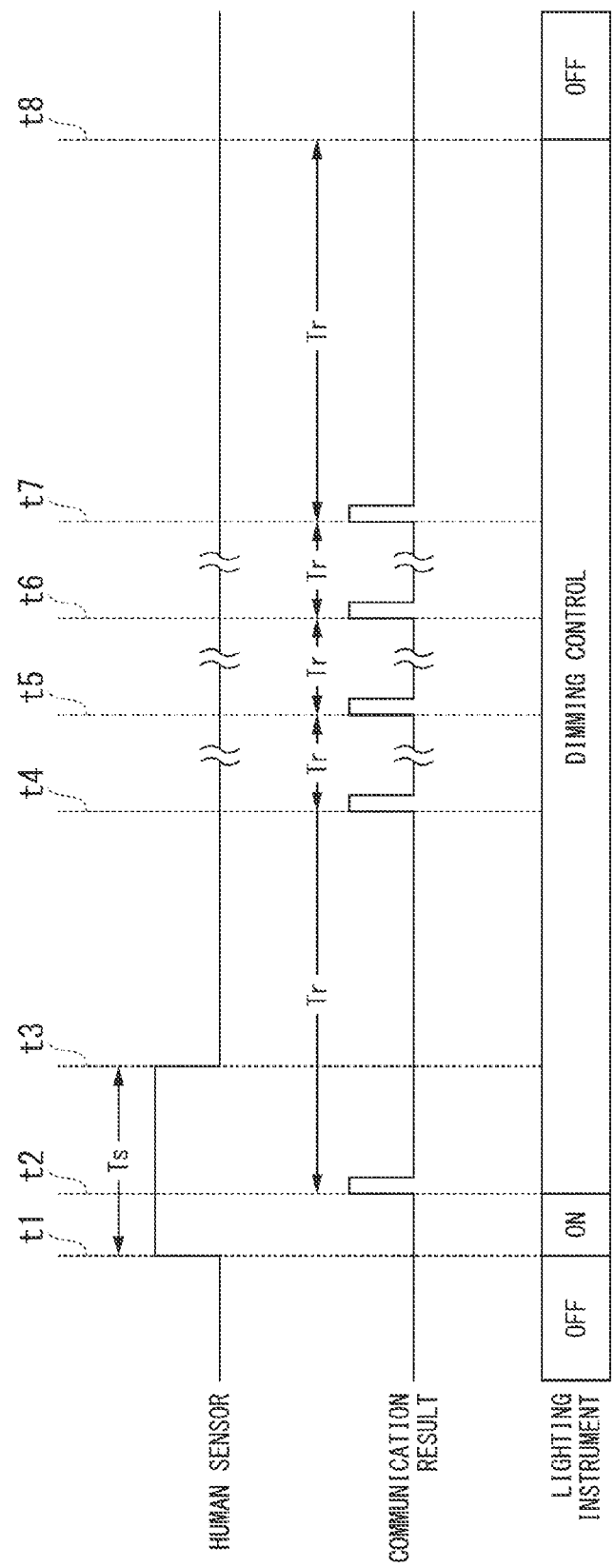
FIG. 8 is a diagram illustrating an example of a state transition of lighting instrument according to control of the instrument control device according to the present embodiment.

FIG. 8 illustrates detection time-points of the human sensor 100 in a certain instrument control area AR, the communication result between the tag reader 320 and the tag 310 carried by the user Y who uses the instrument control area AR, and an operation state of the lighting instrument 210.

The H-level associated with the human sensor 100 illustrated in FIG. 8 indicates a state in which detection information indicating that the presence of a person is detected is output, and the L-level indicates a state in which detection information indicating that the presence of a person is not detected is output. The H-level associated with the communication result indicates the time-point at which communication of the tag reader 320 receiving the user ID transmitted from the tag 310 is executed, and the L-level indicates the time-point at which the communication is not executed.

In FIG. 8, in the period earlier than time-point t1, the presence of a person is not detected by the human sensor 100, and the tag reader 320 is not executing communication with the tag 310.

In this state, in the processes of FIG. 7, a determination result "NO" is obtained in step S101 and a determination result "NO" is obtained in step S106. Thus, the instrument operation control unit 402 executes the process of step S107. Due to this, as illustrated in FIG. 8, the lighting instrument 210 is in the off state in the period earlier than time-point t1.

Moreover, the human sensor 100 detects the presence of a person at time-point t1. In response to this, in the processes of FIG. 7, a determination result "YES" is obtained in step S101. However, in this case, since the tag reader 320 is not communicating with the tag 310, a determination result "NO" is obtained in step S102. Thus, the instrument operation control unit 402 turns the lighting instrument 210 on with the reference luminous intensity in step S103. Due to this, at time-point t1, the lighting instrument 210 transitions from the off state to the on state.

Subsequently, at time-point t2 that occurs after the elapse of a certain period from time-point t1, the tag reader 320 communicates with the tag 310. In this case, the human sensor 100 is in the detection period Ts that starts from time-point t1. Thus, in the processes of FIG. 7 corresponding to this case, a determination result "YES" is obtained in step S101 and a determination result "YES" is obtained in step S102.

In response to this, the adjustment control unit 403 executes dimming control according to the user-specific luminous intensity in the processes of steps S104 and S105. Due to this, in the period later than time-point t2, the lighting instrument 210 in the on state transitions to a dimming control state in which the luminous intensity thereof changes from the reference luminous intensity to the luminous intensity indicated by the user-specific luminous intensity.

Here, a case in which the user Y is in a substantially motionless state in the instrument control area AR at time-point t3 which occurs after the elapse of the detection period Ts from time-point t1 will be described. In this case, the human sensor 100 cannot detect a temperature change in the instrument control area AR. Thus, the human sensor 100 outputs detection information indicating the absence of a person at time-point t3.

In the period later than time-point t3, although the user Y is present in the instrument control area AR, for example, the user Y is in a substantially motionless state. Due to this, in the period later than time-point t3, the human sensor 100 continues outputting the detection information indicating the absence of a person.

However, in the period later than time-point t3, the user Y is still present in the instrument control area AR. Due to this, the tag 310 carried by the user Y executes communication with the tag reader 320 periodically every communication interval Tr after the tag 310 executes first communication with the tag reader 320 at time-point t2. In FIG. 8, the results that the tag 310 has communicated with the tag reader 320 at the time-points t4, t5, t6, and t7 in the period later than time-point t2 are illustrated.

Moreover, the user leaves the office OF in the communication interval Tr between time-points t7 and t8.

Due to this, at time-point t8, the tag reader 320 is not communicating with the tag 310. Thus, in the processes of FIG. 7 corresponding to the time-point t8, a determination result "NO" is obtained in step S101, and a determination result "NO" is obtained in step S106.

Thus, the instrument operation control unit 402 turns the lighting instrument 210 off in step S107. In response to this, at time-point t8, the lighting instrument 210 transitions from the on state at the luminous intensity indicated by the user-specific luminous intensity to the off state.

In this manner, in the present embodiment, the detection information of the human sensor 100 is first used when the lighting instrument 210 turns on.

For example, the human sensor 100 is generally operated with the supply of electricity from a power system such as a commercial power source, and there is no concern of a dead battery even when the human sensor 100 is operated normally. Due to this, the human sensor 100 can perform detection properly and output detection information. Further, if the lighting instrument 210 is turned on according to the detection information indicating that the human sensor 100 has detected the presence of a person, the lighting instrument 210 can be automatically turned on immediately, for example, when the user Y enters the instrument control area AR.

Moreover, the pyroelectric human sensor 100 detects that no person is present if there is no temperature change even when a person is actually present. However, once the lighting instrument 210 is turned on, the instrument operation control unit 402 controls the lighting instrument 210 to remain on as long as the tag 310 executes communication with the tag reader 320 periodically. Due to this, even when the user Y is substantially motionless and the human sensor 100 has not detected the presence of a person, for example, the lighting instrument 210 remains on.

In the present embodiment, the lighting instrument 210 is turned off when conditions that the absence of a person be detected by the human sensor 100 and the tag 310 not communicate with the tag reader 320 are satisfied. Due to this, the lighting instrument 210 can be turned off when the user Y is certainly not present in the instrument control area AR.

In this manner, in the present embodiment, the power of the lighting instrument 210 is controlled using both the human sensor 100 and the tag 310. Due to this, in the present embodiment, it is possible for the lighting instrument 210 to remain on when the user Y is highly likely to be present, for example, even when the user Y is substantially motionless and no temperature change is detected, while using the human sensor 100.

Moreover, for example, when lighting is controlled to start according to communication between the tag 310 and the tag reader 320, if the lighting instrument 210 is turned on immediately upon detection of the presence of the user Y, the communication interval Tr needs to be shortened to approximately several seconds. When the communication interval Tr is shortened in this manner, the battery life decreases remarkably.

In contrast, in the present embodiment, the lighting instrument 210 turns on based on only the detection information of the human sensor 100, and whether or not it remains on is determined using the communication result between the tag 310 and the tag reader 320. Due to this, the communication interval Tr of the tag 310 can be set to approximately several minutes, for example. In this way, it is possible to maintain the battery life of the tag 310 at a predetermined level or higher.

Further, in the present embodiment, the user ID is stored in the tag 310 and the user ID is transmitted to the tag reader 320, whereby the user Y whose presence is detected by the human sensor 100 can be specified. In the present embodiment, the user-specific luminous intensity of each user is stored in the control information using the user ID, whereby careful dimming control can be realized such that the luminous intensity corresponding to the preference of the user in the respective instrument control areas AR, for example, can be set in the lighting instrument 210.

Modification

Next, modifications of the present embodiment will be described.

In the description above, the instrument control device 400 controls the power and dimming of the lighting instrument 210 as a control target.

However, the instrument control device 400 of the present embodiment may control instrument other than the lighting instrument 210 as a control target, for example. As an example, the instrument control device 400 may control air-conditioning instrument in a facility such as the office OF, for example.

Thus, an example of an instrument control system in which the instrument control device 400 controls air-conditioning instrument as a control target will be described as a modification.

In such an instrument control system, air-conditioning instrument (not illustrated) is installed in the respective instrument control areas AR, for example, in the office OF of FIG. 1. Moreover, the control information stored in the control information storage unit 404 further includes an air-conditioning instrument ID and a user-specific setting temperature for each record. The air-conditioning instrument ID is an identifier for uniquely identifying air-conditioning instrument in each instrument control area AR. The user-specific setting temperature is the setting temperature of air-conditioning instrument set in accordance with the preference of the corresponding user Y, for example.

A process flow example of the processes executed by the instrument control device 400 of the modification is equivalent to that of FIG. 7.

However, in step S103, the instrument operation control unit 402 starts the air-conditioning operation of the air-conditioning instrument according to a reference setting temperature, for example. Moreover, the adjustment control unit 403 acquires the user-specific setting temperature from the control information in step S104 and sets the setting temperature of the air-conditioning instrument to a value indicated by the user-specific setting temperature in step S105. Moreover, the instrument operation control unit 402 stops the air-conditioning operation of the air-conditioning instrument in step S107.

As described above, in the modification, when the presence of a person is detected by the human sensor 100, the air-conditioning operation of the air-conditioning instrument in the instrument control area AR starts. Moreover, when the air-conditioning operation is performed and communication between the tag 310 and the tag reader 320 is performed, the temperature corresponding to the temperature of the user, for example, is set in the instrument control area AR.

Moreover, when the absence of a person is detected by the human sensor 100 and communication between the tag 310 and the tag reader 320 is not performed, the air-conditioning operation of the air-conditioning instrument stops.

In the description above, although a case of controlling instrument in the office OF has been described by way of an example, the instrument control configuration of the embodiment of the present invention can be applied to an environment other than the office, for example, a public facility such as a library or a place such as a restaurant.

Moreover, a program for realizing the functions of the respective functional units of the instrument control device 400 illustrated in FIG. 5 may be recorded on a computer-readable recording medium, the program recorded on the recording medium may be read and executed by a computer system, whereby the instrument may be controlled. The "computer system" mentioned herein includes an OS and hardware such as peripheral instrument.

Moreover, the "computer system" may include a homepage-providing environment (or a homepage displaying environment) when a WWW system is used.

Moreover, the "computer-readable recording medium" means a portable medium such as a flexible disk, a magneto-optical disc, a ROM, or a CD-ROM and a storage device such as a hard disk included in a computer system. Further, the "computer-readable recording medium" also includes a volatile memory (RAM) included in a computer system, which serves as a server and a client when a program is transmitted via a network such as the Internet or a communication line such as a telephone line, and which stores the program for a predetermined period. Further, the program may realize a portion of the functions and may realize the functions in cooperation with a program which is already recorded in the computer system.

While embodiments of the present invention have been described in detail with reference to the drawings, the specific configuration is not limited to these embodiments, and changes in design or the like can be made without departing from the spirit of the present invention.

INDUSTRIAL APPLICABILITY

Embodiments of the present invention can be applied to an instrument control device, an instrument control system, an instrument control method, a program, and the like, in which it is necessary to control instrument while avoiding detection errors of a human sensor and maintaining the battery life of tags at a predetermined level or higher.

DESCRIPTION OF THE REFERENCE SYMBOLS

10: Instrument control system
100: Human sensor
210: Lighting instrument
220: Dimming control device
310: Tag
320: Tag reader
400: Instrument control device
401: Communication unit
402: Instrument operation control unit
403: Adjustment control unit
404: Control information storage unit

The invention claimed is:

1. An instrument control device comprising:
a communication unit that communicates with a human sensor that detects the presence of a person in a predetermined area based on a temperature change in the predetermined area, a tag-corresponding communication device that communicates with a tag positioned in the predetermined area, and instrument that performs a predetermined operation;
an instrument operation control unit that causes the instrument to start the predetermined operation when the human sensor detects the presence of a person and that stops the predetermined operation of the instrument when the absence of a person is detected by the human sensor and the tag-corresponding communication device is not communicating with the tag; and
an adjustment control unit that changes a predetermined adjustment item of the predetermined operation when the predetermined operation of the instrument started by the instrument operation control unit is executed and the tag-corresponding communication device is communicating with the tag, wherein the human sensor is installed in each of a plurality of predetermined areas, the instrument is installed in each of the plurality of predetermined areas, the instrument control device further comprises a control information storage unit that stores control information indicating at least an association among the human sensor, the instrument, a user carrying the tag, and an adjustment parameter corresponding to the adjustment item, and the adjustment control unit changes the adjustment item of the instrument associated with the user carrying the tag according to the adjustment parameter associated with the user carrying the tag based on the control information when the predetermined operation of the instrument started by the instrument operation control unit is executed and the tag-corresponding communication device is communicating with the tag.

2. An instrument control device comprising:

a communication unit that communicates with a human sensor that detects the presence of a person in a predetermined area based on a temperature change in the predetermined area, a tag-corresponding communication device that communicates with a tag positioned in the predetermined area, and instrument that performs a predetermined operation; and an instrument operation control unit that causes the instrument to start the predetermined operation when the human sensor detects the presence of a person and that stops the predetermined operation of the instrument when the absence of a person is detected by the human sensor and the tag-corresponding communication device is not communicating with the tag, wherein the human sensor is installed in each of a plurality of predetermined areas, the instrument is installed in each of the plurality of predetermined areas, the instrument control device further comprises a control information storage unit that stores control information indicating at least an association among the human sensor, the instrument, and a user carrying the tag, and the instrument operation control unit starts the predetermined operation of the instrument associated with the human sensor having detected the presence of a person based on the control information and stops the predetermined operation of the instrument associated with the human sensor having detected the absence of a person based on the control information when the tag carried by the user associated with the human sensor having detected the absence of a person is not communicating.

3. An instrument control system comprising:

a human sensor that detects the presence of a person in a predetermined area based on a temperature change in the predetermined area;

a tag-corresponding communication device that communicates with a tag positioned in the predetermined area; and an instrument control device that controls instrument that performs a predetermined operation, wherein the instrument control device includes:

an instrument operation control unit that causes the instrument to start the predetermined operation when the human sensor detects the presence of a person and that stops the predetermined operation of the instrument when the absence of a person is detected by the human sensor and the tag-corresponding communication device is not communicating with the tag; and an adjustment control unit that changes a predetermined adjustment item of the predetermined operation when the predetermined operation of the instrument started by the instrument operation control unit is executed and the tag-corresponding communication device is communicating with the tag, wherein the human sensor is installed in each of a plurality of predetermined areas, and wherein the instrument is installed in each of the plurality of predetermined areas, and wherein the instrument control device further comprises a control information storage unit that stores control information indicating at least an association among the human sensor, the instrument, a user carrying the tag, and an adjustment parameter corresponding to the adjustment item, and wherein the adjustment control unit changes the adjustment item of the instrument associated with the user carrying the tag according to the adjustment parameter associated with the user carrying the tag based on the control information when the predetermined operation of the instrument started by the instrument operation control unit is executed and the tag-corresponding communication device is communicating with the tag.

4. An instrument control method comprising:

communicating with a human sensor that is installed to detect the presence of a person in a predetermined area based on a temperature change in the predetermined area, a tag-corresponding communication device that communicates with a tag positioned in the predetermined area, and instrument that performs a predetermined operation;

causing the instrument to start the predetermined operation when the human sensor detects the presence of a person;

stopping the predetermined operation of the instrument when the absence of a person is detected by the human sensor and the tag-corresponding communication device is not communicating with the tag;

changing a predetermined adjustment item of the predetermined operation when the predetermined operation of the instrument that has been started is executed and the tag-corresponding communication device is communicating with the tag, wherein the human sensor is installed in each of a plurality of predetermined areas, wherein the instrument is installed in each of the plurality of predetermined areas;

storing control information indicating at least an association among the human sensor, the instrument, a user carrying the tag, and an adjustment parameter corresponding to the adjustment item; and changing the adjustment item of the instrument associated with the user carrying the tag according to the adjustment parameter associated with the user carrying the tag based on the control information when the predetermined operation of the instrument that has been started is executed and the tag-corresponding communication device is communicating with the tag.

5. A non-transitory computer-readable storage medium storing a computer program, which when executed by a processor of a device, causes the device to perform:

communicating with a human sensor that is installed to detect the presence of a person in a predetermined area based on a temperature change in the predetermined area, a tag-corresponding communication device that communicates with a tag positioned in the predetermined area, and instrument that performs a predetermined operation;

causing the instrument to start the predetermined operation when the human sensor detects the presence of a person;

stopping the predetermined operation of the instrument when the absence of a person is detected by the human sensor and the tag-corresponding communication device is not communicating with the tag;

changing a predetermined adjustment item of the predetermined operation when the predetermined operation of the instrument that has been started is executed and the tag-corresponding communication device is communicating with the tag, wherein the human sensor is installed in each of a plurality of predetermined areas, wherein the instrument is installed in each of the plurality of predetermined areas;

storing control information indicating at least an association among the human sensor, the instrument, a user carrying the tag, and an adjustment parameter corresponding to the adjustment item; and changing the adjustment item of the instrument associated with the user carrying the tag according to the adjustment parameter associated with the user carrying the tag based on the control information when the predetermined operation of the instrument that has been started is executed and the tag-corresponding communication device is communicating with the tag.

* * * * *